(12) United States Patent
Fouda et al.

(10) Patent No.: US 12,541,036 B2
(45) Date of Patent: Feb. 3, 2026

(54) MULTI-CHANNEL MACHINE LEARNING MODEL-BASED INVERSION

(71) Applicant: Halliburton Energy Services, Inc., Houston, TX (US)

(72) Inventors: Ahmed Fouda, Houston, TX (US); Junwen Dai, Houston, TX (US); Xusong Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/408,340

(22) Filed: Jan. 9, 2024

(65) Prior Publication Data

US 2024/0151873 A1 May 9, 2024

Related U.S. Application Data

(63) Continuation of application No. 17/567,666, filed on Jan. 3, 2022, now Pat. No. 11,914,096.

(51) Int. Cl.
*G01V 3/30* (2006.01)
*G01V 3/38* (2006.01)
(Continued)

(52) U.S. Cl.
CPC ............... *G01V 3/30* (2013.01); *G01V 3/38* (2013.01); *G01V 20/00* (2024.01); *G06N 20/00* (2019.01)

(58) Field of Classification Search
CPC ... G01V 3/30; G01V 3/28; G01V 3/18; G01V 3/00; G01V 3/38; G01V 3/34;
(Continued)

(56) References Cited

U.S. PATENT DOCUMENTS 9,715,034 B2  7/2017  Omeragic et al.
10,883,966 B2 * 1/2021 Zheng ................... G01R 33/09
(Continued)

FOREIGN PATENT DOCUMENTS

WO    2015-157268    10/2015
WO    2018031047     2/2018

OTHER PUBLICATIONS

International Search Report and Written Opinion for Application No. PCT/US2022/011840, dated Sep. 28, 2022.
(Continued)

*Primary Examiner* — Mohamed Charioui
(74) *Attorney, Agent, or Firm* — John Wustenberg; C. Tumey Law Group PLLC

(57) ABSTRACT

A method for estimating a pipe property may include disposing an electromagnetic (EM) logging tool in a wellbore. The EM logging tool may comprise a transmitter disposed on the EM logging tool and a receiver disposed on the EM logging tool. The method may further include transmitting an electromagnetic field from the transmitter into a tubular string to energize the tubular string with the electromagnetic field thereby producing an eddy current that emanates from the tubular string. The method may further include measuring the eddy current in the tubular string with the receiver on at least one channel to obtain one or more measurements from the EM logging tool. The method may further include forming an EM log from the one or more measurements, forming a relationship between a set of one or more previously analyzed measurements and at least one pipe property, and estimating the at least one pipe property from the formed relationship and the one or more measurements from the EM logging tool.

19 Claims, 10 Drawing Sheets

(51) Int. Cl.
*G01V 20/00* (2024.01)
*G06N 20/00* (2019.01)

(58) Field of Classification Search
CPC ........ G01V 20/00; G06N 20/00; G06N 3/006;
G06N 3/0464; G06N 3/09; G06N 3/092
See application file for complete search history.

(56) References Cited

U.S. PATENT DOCUMENTS

| | | |
|---|---|---|
| 10,901,111 B2 | 1/2021 | Donderici et al. |
| 2017/0123096 A1 | 5/2017 | Wilson et al. |
| 2017/0248728 A1 | 8/2017 | Fouda et al. |
| 2018/0106763 A1 | 4/2018 | Fouda et al. |
| 2018/0149019 A1 | 5/2018 | Bose et al. |
| 2019/0078430 A1 | 3/2019 | Fouda et al. |
| 2019/0196039 A1 | 6/2019 | Wilson et al. |
| 2020/0003929 A1 | 1/2020 | Wilson et al. |
| 2020/0182830 A1 | 6/2020 | Fouda et al. |
| 2020/0190969 A1 | 6/2020 | Ren et al. |
| 2020/0200940 A1* | 6/2020 | Fouda .................... G01V 3/28 |
| 2020/0209425 A1 | 7/2020 | Ewe et al. |
| 2020/0271818 A1 | 8/2020 | Fouda et al. |
| 2020/0284141 A1 | 9/2020 | San Martin et al. |
| 2020/0309986 A1* | 10/2020 | Donderici ............... G01V 3/28 |
| 2020/0319362 A1 | 10/2020 | Guner et al. |
| 2020/0333500 A1 | 10/2020 | Fouda et al. |
| 2020/0378240 A1 | 12/2020 | Fouda et al. |
| 2021/0054731 A1 | 2/2021 | Fouda et al. |
| 2021/0239874 A1 | 8/2021 | Fouda |
| 2021/0256671 A1 | 8/2021 | Guner et al. |
| 2021/0301644 A1* | 9/2021 | Rao ....................... G06N 5/025 |
| 2021/0304386 A1 | 9/2021 | Guner et al. |

OTHER PUBLICATIONS

Office Action Summary for U.S. Appl. No. 17/567,666 dated Feb. 28, 2023.
Final Office Action Summary for U.S. Appl. No. 17/567,666 dated Aug. 22, 2023.
Notice of Allowance for U.S. Appl. No. 17/567,666 dated Nov. 22, 2023.

* cited by examiner

MULTI-CHANNEL MACHINE LEARNING MODEL-BASED INVERSION

CROSS REFERENCE TO RELATED APPLICATIONS

This is a continuation application of U.S. Nonprovisional patent application Ser. No. 17/567,666 filed Jan. 3, 2022, the entirety of which is incorporated by reference herein in its entirety.

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. The cement may both adhere the casing to the wellbore wall to provide mechanical support to the well while also providing protection against produced or injected chemicals which may be deleterious to the casing. In some well installations, multiple casing strings are employed (e.g., a concentric multi-string arrangement) to allow for different operations related to well completion, production, or enhanced oil recovery (EOR) options.

Continuous or extended exposure to corrosive and/or abrasive matter, as may be common in standard wellbore operations, may result in undesirable casing wear. Efforts to mitigate corrosion comprise use of corrosion-resistant alloys, coatings, treatments, and corrosion transfer, among others. Additionally, it may be necessary to monitor and assess the integrity of a casing string throughout the life of the wellbore. For downhole casing strings, various types of corrosion monitoring tools are available. One type of corrosion monitoring tool uses electromagnetic (EM) fields to estimate pipe thickness or other corrosion indicators.

As a standard operating practice, the measurements acquired from EM tools may require additional interpretation in the form of prior knowledge in order to evaluate the integrity and thickness of the casing string. In particular, developing a meaningful assessment of the casing string may involve solving a model-based inversion which incorporates inversion hyperparameters along with the measurements of the EM tool. The utilized inversion hyperparameters may vary for a particular wellbore design or scenario and determining which values to use may require prior knowledge. The human guidance utilized to determine the hyperparameters may prove to be subjective in accordance with the experience and knowledge of the individual performing the assessment, which may result in inconsistent interpretations. In addition to the potential inconsistencies, relying on human guidance may be time consuming and therefor it may be desirable to have a data-driven methodology which is both reliable and consistent in determining the hyperparameters for the inversion solution.

BRIEF DESCRIPTION OF THE DRAWINGS

These drawings illustrate certain aspects of some examples of the present disclosure and should not be used to limit or define the disclosure.

DETAILED DESCRIPTION

Figure 1:
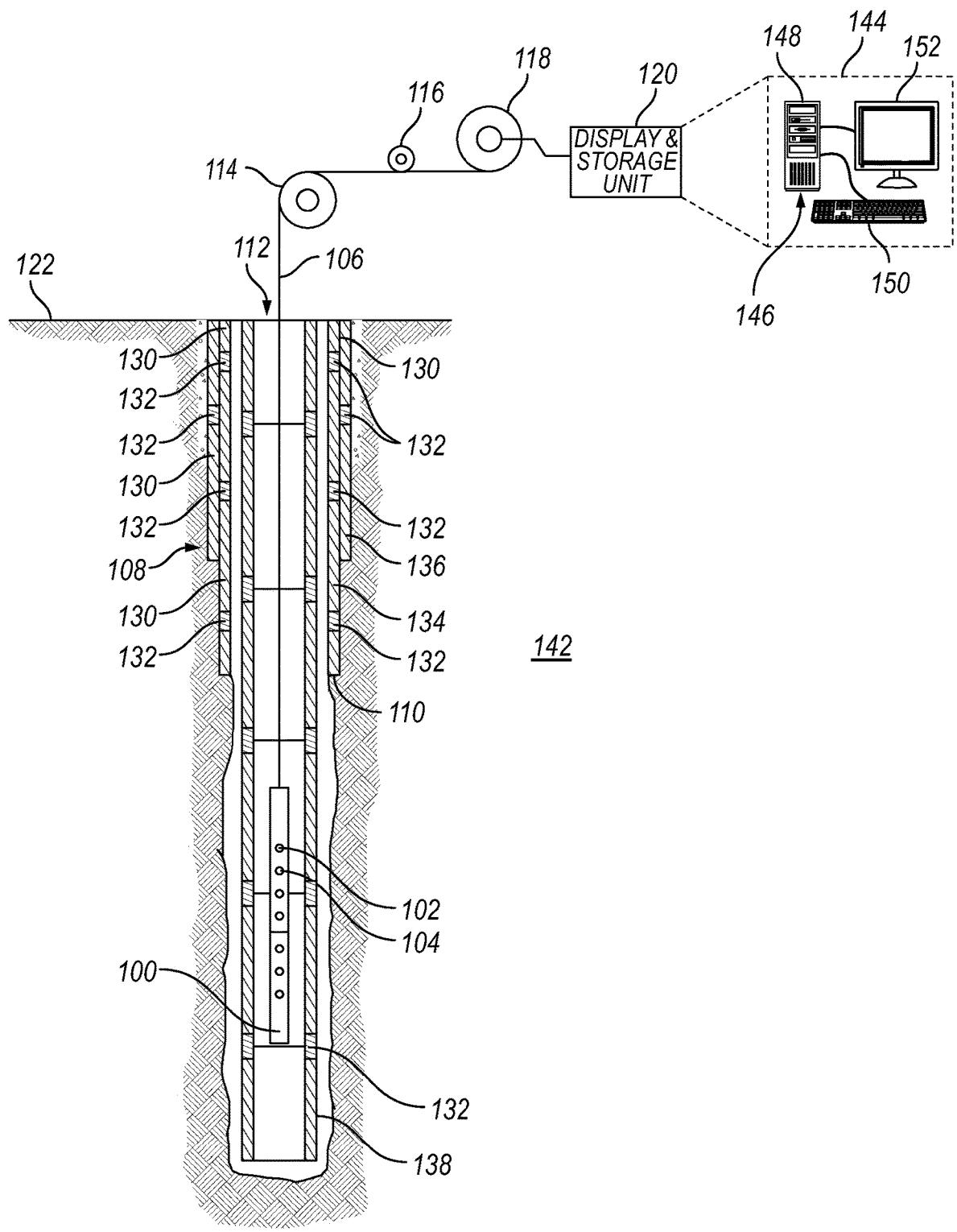
FIG. 1 illustrates an example of an EM logging tool disposed in a wellbore.

This disclosure may generally relate to pipe inspection in subterranean wells and, more particularly, to methods and systems for utilizing machine learning to assist in providing consistent and reliable assessments of casing integrity and casing thickness. Machine learning algorithms may be useful in identifying the underlying relationships in previously amassed datasets which may result in more reliable, reproducible, and expedient casing integrity and thickness assessments for new and varied casing configurations. In one example, machine learning may assist in the determination of appropriate the inversion hyperparameters which may be incorporated in an iterative inversion calculation to determine the integrity and thickness of a casing string. In another example, the machine learning application may be expanded beyond the prediction of the inversion hyperparameters to function as a replacement for the inversion calculation in total. Replacing either of the inversion hyperparameter determination or the inversion calculation workflow with a machine learning model may reduce the computational requirements for generating an assessment of casing integrity and thickness while providing a consistent and repeatable analysis.

Before machine learning models are applied, EM data may be collected by a logging tool. EM logging tools may measure eddy currents to determine metal loss and use magnetic cores with one or more coils to detect defects in multiple concentric pipes. The EM logging tools may use pulse eddy current (time-domain) and may employ multiple (long, short, and transversal) coils to evaluate multiple types of defects in multiple concentric pipes. The measurements (m) acquired from EM logging tools, in a non-limiting example, may include measured responses or multi-channel measurements. In some examples, EM logging tools may be referred to as pipe inspection tools. It should be noted that the techniques utilized in time-domain may be utilized in frequency-domain measurements. In examples, EM logging tools may operate on a conveyance. Additionally, EM logging tools may comprise an independent power supply and may store the acquired data on memory.

Monitoring the condition of the production and intermediate casing strings may be crucial in oil and gas field operations. EM eddy current (EC) techniques have been successfully used in inspection of these components. EM EC techniques comprise two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal. This relationship may allow for measurements of metal loss, which typically is due to an anomaly related to the pipe such as corrosion or buckling. In some examples the measurements may comprise multi-frequency measurements and/or multi-spacing measurements.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may comprise one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may comprise an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 may be connected to the adjacent segments by a collar 132. There may be any number of layers in casing string 108. FIG. 1 depicts a first casing 134 and a second casing 136, but it should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. EM logging tool 100 may be dimensioned so that it may be lowered into the wellbore 110 through pipe string 138, thus avoiding the difficulty and expense associated with pulling pipe string 138 out of wellbore 110.

EM logging tool 100 may comprise a digital telemetry system which may further comprise one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may comprise signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as a primary electromagnetic field. The primary electromagnetic fields may produce Eddy currents in casing string 108 and pipe string 138. It should be noted that casing string 108 and pipe string 138 may both be generally referred to individually or as a group as a tubular sting. These Eddy currents, in turn, produce secondary electromagnetic fields that may be sensed and/or measured by receivers 104. Characterization of casing string 108 and pipe string 138, including determination of pipe attributes, may be performed by measuring and processing primary and secondary electromagnetic fields. Pipe attributes may comprise, but are not limited to, pipe thickness, pipe conductivity, and/or pipe permeability. In some examples the pipe attributes may be determined for individual pipes.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may comprise more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may comprise a transmitter 102 and receiver 104 that are in the form of coils or solenoids coaxially positioned within a downhole tubular (e.g., casing string 108) and separated along the tool axis. Alternatively, EM logging tool 100 may comprise a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may comprise an information handling system 144. As illustrated, the information handling system 144 may be a component of or be referred to as the display and storage unit 120, or vice-versa. Alternatively, the information handling system 144 may be a component of EM logging tool 100. An information handling system 144 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, a data center, or any other suitable device and may vary in size, shape, performance, functionality, and price.

Information handling system 144 may comprise a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may comprise any instrumentality or aggregation of instrumentalities that may retain data and/or instructions for a period of time. Non-transitory computer readable media 148 may comprise, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/ or flash memory; as well as communications media such wires, optical fibers, microwaves, radio waves, and other electromagnetic and/or optical carriers; and/or any combination of the foregoing. Information handling system 144 may also comprise input device(s) 150 (e.g., keyboard, mouse, touchpad, etc.) and output device(s) 152 (e.g., monitor, printer, etc.). The input device(s) 150 and output device (s) 1:52 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may comprise, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements (m) may be taken in the time-domain and/or frequency range. In some examples, the measurements (m) may comprise multi-frequency measurements and/or multi-spacing measurements. EM logging tool 100 may make a second measurement in a casing string 108 of first casing 134, wherein first casing 134 comprises any suitable number of pipes connected by collars 132. These measurements (m) may be repeated any number of times for first casing 134, for second casing 136, and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}t \quad (1)$$

and the magnitude of the impedance shows the dependence:

$$\exp\left[-2\left(\sqrt{\frac{\omega\mu\sigma}{2}}\right)t\right] \quad (2)$$

where ω is the angular frequency of the excitation source, μ is the magnetic permeability of the pipe, σ is the electrical conductivity of the pipe, and t is the thickness of the pipe. By using the common definition of skin depth for the metals as:

$$\delta = \sqrt{\frac{2}{\omega\mu\sigma}} \quad (3)$$

The phase of the impedance varies as:

$$\varphi \cong 2\frac{t}{\delta} \quad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may comprise frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
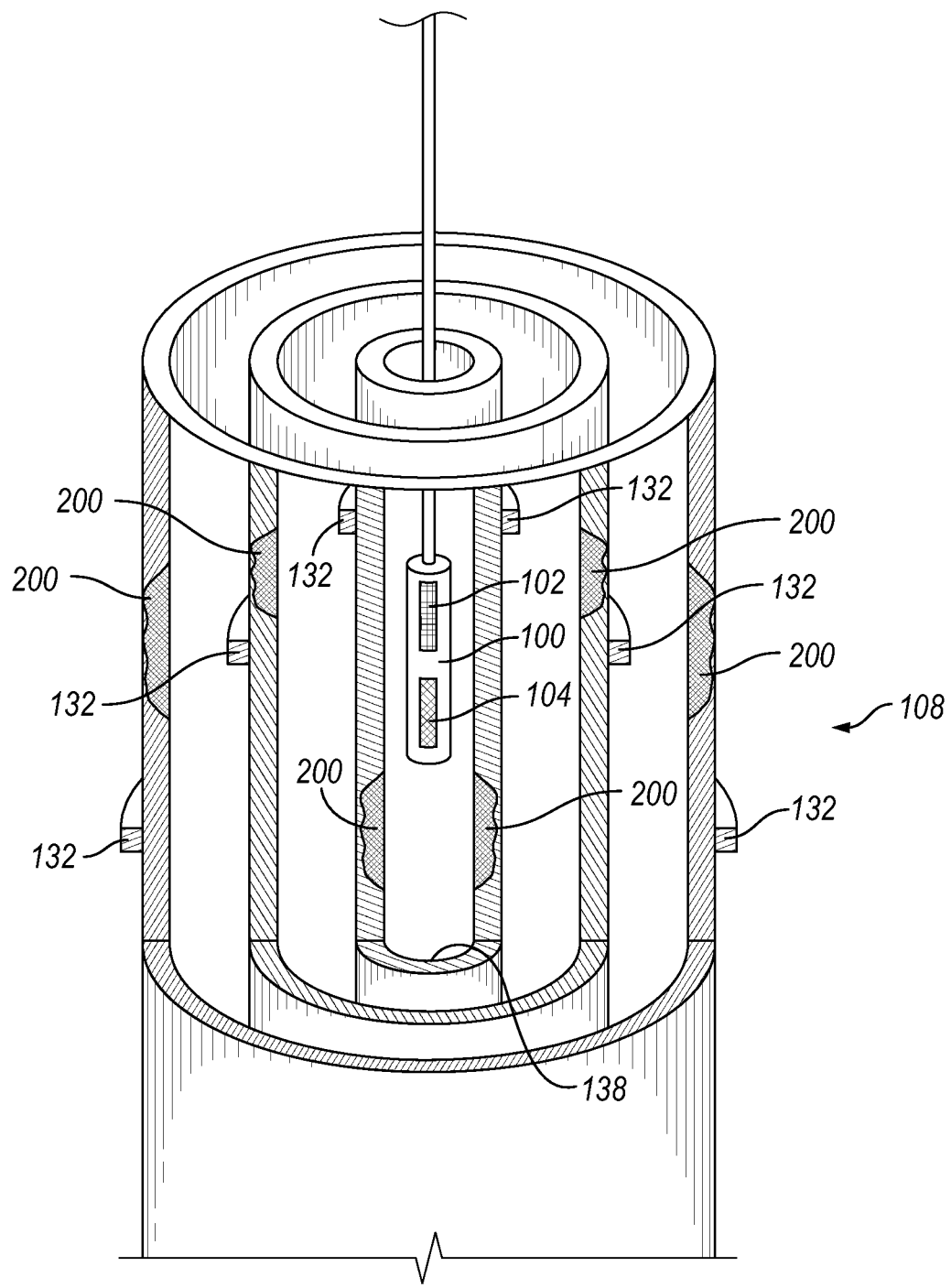
FIG. 2 illustrates an example of arbitrary defects within multiple pipes.
Figure 3A:
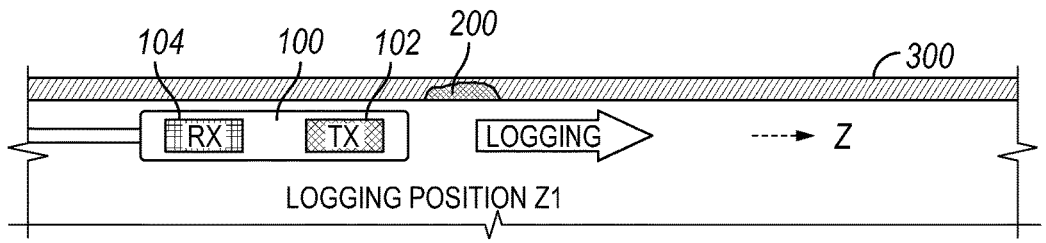
FIG. 3A illustrates an example of an EM logging tool traversing a wellbore.
Figure 3B:
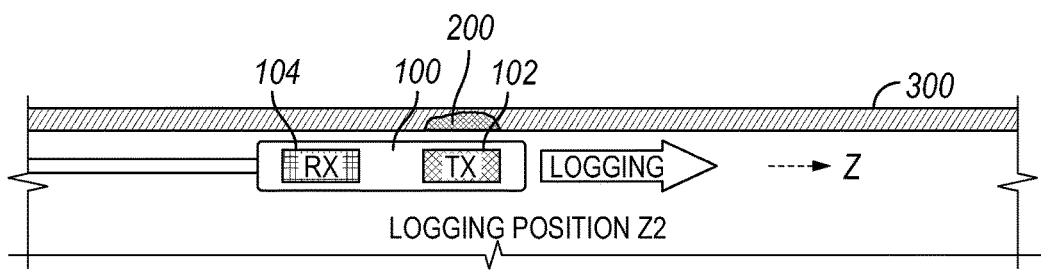
FIG. 3B illustrates another example of an EM logging tool traversing a wellbore.
Figure 3C:
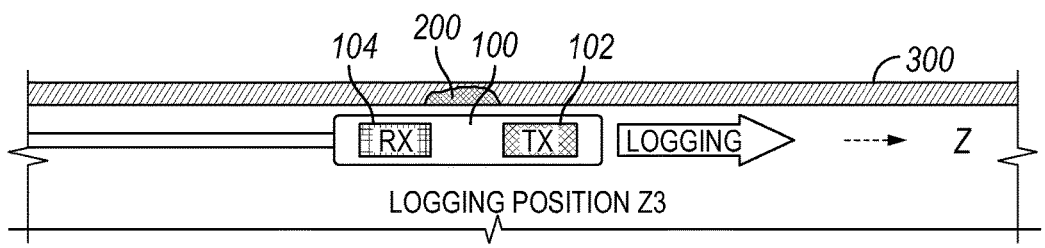
FIG. 3C illustrates another example of an EM logging tool traversing a wellbore.
Figure 3D:
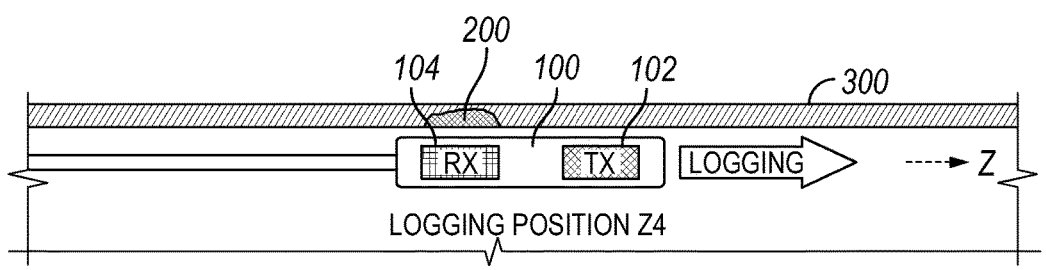
FIG. 3D illustrates another example of an EM logging tool traversing a wellbore.
Figure 3E:
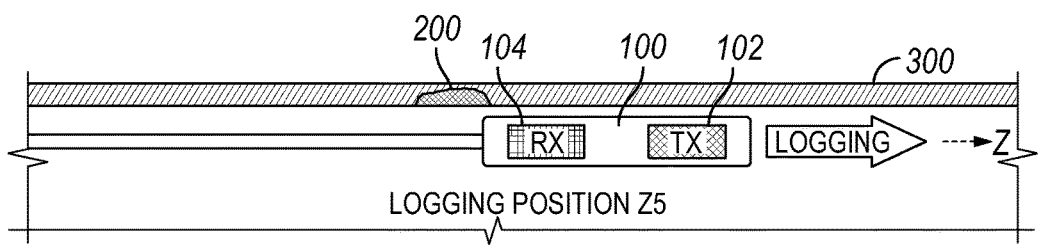
FIG. 3E illustrates another example of an EM logging tool traversing a wellbore.

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may comprise model-based inversion which may comprise forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

FIGS. 3A-3E illustrates an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 may be sensitive to deeper ($2^{nd}$, $3^{rd}$, etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) spatial spread of long spaced transmitter-receiver signal for a collar 132 may be long (up to 6 feet); (4) to accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and misalignments between the documented casing design and the actual casing design. Multiplicative coefficients and constant factors may be applied, either together or individually, to the measured EM log for this calibration.

Figure 4:
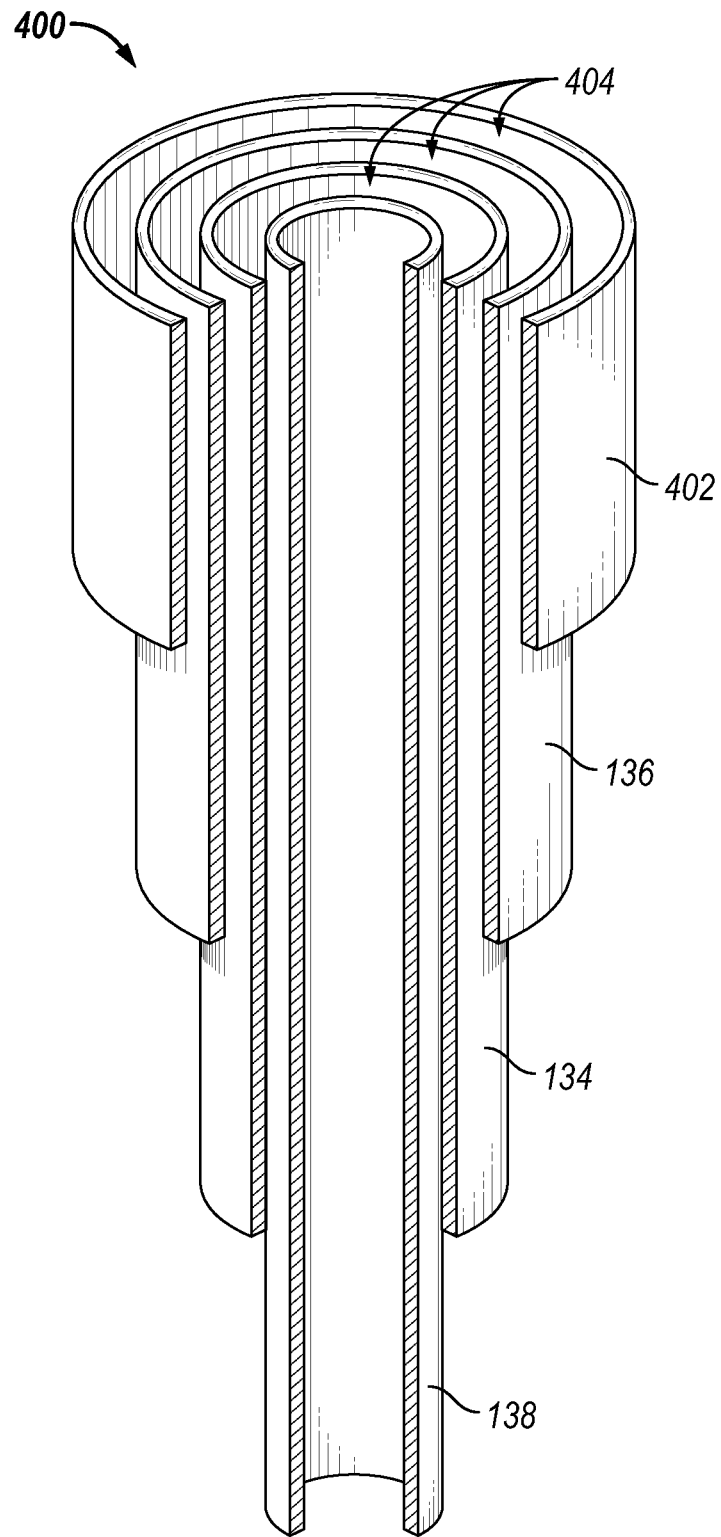
FIG. 4 illustrates an example of a 3-dimensional casing design.

FIG. 4 illustrates an example of a casing design 400 in accordance with some embodiments. Casing design 400 may be described according to the number of casing strings utilized to stabilize the wellbore both axially and concentrically, the nominal size and weight of the casing strings, and the starting and ending depths of the casing strings. In some examples, the nominal size and weight of the casing may be the initial and/or manufactured size and weight of the casing. In further examples, the size of the casing string may refer to the inner diameter of the casing string along with the wall thickness of the casing string. Depending on the requirements of casing design 400, well construction may have two or more main components. These components may comprise conductor, surface, intermediate and production casings. After completion of the well, a tubing may be inserted to facilitate the production of hydrocarbon products. In this example, casing design 400 may comprise pipe string 138, first casing 134, second casing 136, a conductor casing 402, and wherein cement may be disposed in annulus 404 between each casing. However, it should be noted that casing design 400 may comprise any number of pipes, casings, tubulars, and/or the like. Casing design 400 is not limited or bound by the four pipes that are displayed in FIG. 4. When EM logging tool 100 is used to monitor the pipe condition a log may be produced.

Monitoring the condition of the casing strings is crucial in oil and gas field operations. As discussed above, EM techniques may be used to inspect pipes, casings, tubulars, and/or the like. To acquire stronger response from the outer pipes of a nested tubulars, typically, a larger transmitter coil is employed together with larger receiver coils that are placed at large distances away from the transmitter with low frequency excitation. However, such measurements degrade the vertical (along the depth) resolution in the thickness estimation results, and since omnidirectional coils are used, measurements made by such tools lack any directional sensitivity. On the other hand, there are some corrosion tools used on casing inspection which have a very high-resolution and circumferential information. These high-resolution tools may be flux leakage tools, ultrasonic tools, mechanical caliper, and others that typically analyze one immediate pipe only at each logging.

Figure 5:
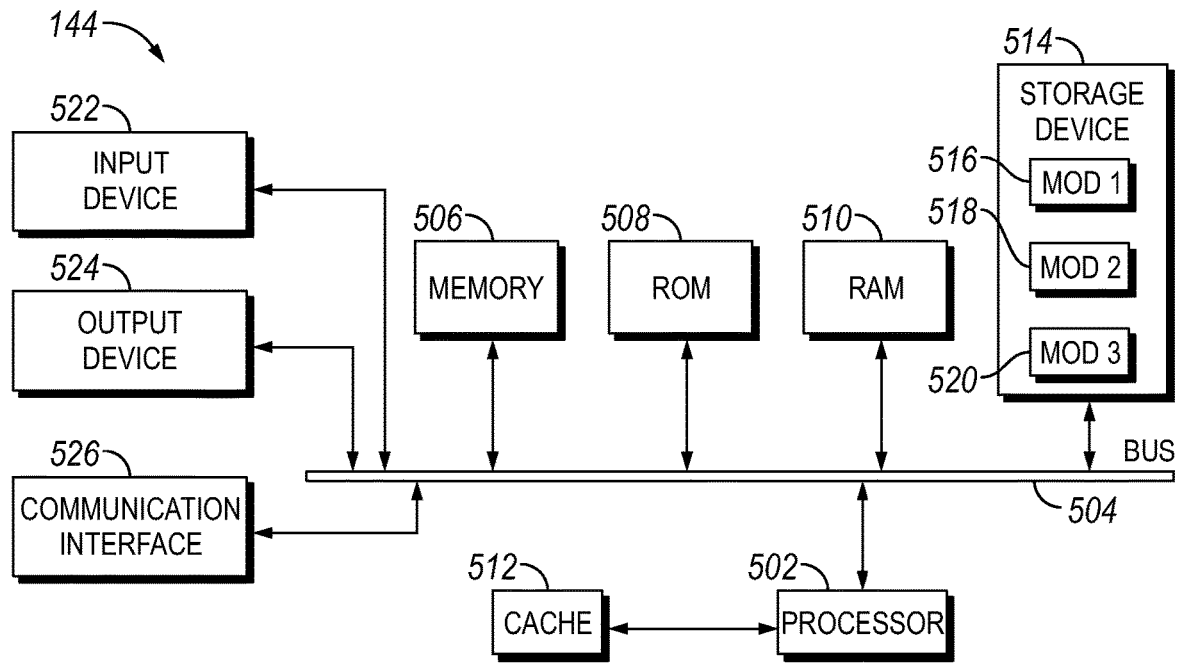
FIG. 5 illustrates a schematic view of an information handling system.

FIG. 5 illustrates an example information handling system 144 which may be employed to perform various steps, methods, and techniques disclosed herein. Persons of ordinary skill in the art will readily appreciate that other system examples are possible. As illustrated, information handling system 144 comprises a processing unit (CPU or processor) 502 and a system bus 504 that couples various system components including system memory 506 such as read only memory (ROM) 508 and random-access memory (RAM) 510 to processor 502. Processors disclosed herein may all be forms of this processor 502. Information handling system 144 may comprise a cache 512 of high-speed memory connected directly with, in close proximity to, or integrated as part of processor 502. Information handling system 144 copies data from memory 506 and/or storage device 514 to cache 512 for quick access by processor 502. In this way, cache 512 provides a performance boost that avoids processor 502 delays while waiting for data. These and other modules may control or be configured to control processor 502 to perform various operations or actions. Other system memory 506 may be available for use as well. Memory 506 may comprise multiple different types of memory with different performance characteristics. It may be appreciated that the disclosure may operate on information handling system 144 with more than one processor 502 or on a group or cluster of computing devices networked together to provide greater processing capability. Processor 502 may comprise any general-purpose processor and a hardware module or software module, such as first module 516, second module 518, and third module 520 stored in storage device 514, configured to control processor 502 as well as a special-purpose processor where software instructions are incorporated into processor 502. Processor 502 may be a self-contained computing system, containing multiple cores or processors, a bus, memory controller, cache, etc. A multi-core processor may be symmetric or asymmetric.

Processor 502 may comprise multiple processors, such as a system having multiple, physically separate processors in different sockets, or a system having multiple processor cores on a single physical chip. Similarly, processor 502 may comprise multiple distributed processors located in multiple separate computing devices but working together such as via a communications network. Multiple processors or processor cores may share resources such as memory 506 or cache 512 or may operate using independent resources. Processor 502 may comprise one or more state machines, an application specific integrated circuit (ASIC), or a programmable gate array (PGA) including a field PGA (FPGA).

Each individual component discussed above may be coupled to system bus 504, which may connect each and every individual component to each other. System bus 504 may be any of several types of bus structures including a memory bus or memory controller, a peripheral bus, and a local bus using any of a variety of bus architectures. A basic input/output (BIOS) stored in ROM 508 or the like, may provide the basic routine that helps to transfer information between elements within information handling system 144, such as during start-up. Information handling system 144 further comprises storage devices 514 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 514 may comprise software modules 516, 518, and 520 for controlling processor 502. Information handling system 144 may comprise other hardware or software modules. Storage device 514 is connected to the system bus 504 by a drive interface. The drives and the associated computer-readable storage devices provide non-volatile storage of computer-readable instructions, data structures, program modules and other data for information handling system 144. In one aspect, a hardware module that performs a particular function comprises the software component stored in a tangible computer-readable storage device in connection with the necessary hardware components, such as processor 502, system bus 504, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 502 executes instructions to perform "operations", processor 502 may perform the operations directly and/or facilitate, direct, or cooperate with another device or component to perform the operations.

As illustrated, information handling system 144 employs storage device 514, which may be a hard disk or other types of computer-readable storage devices which may store data that are accessible by a computer, such as magnetic cassettes, flash memory cards, digital versatile disks (DVDs), cartridges, random access memories (RAMs) 510, read only memory (ROM) 508, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 522 represents any number of input mechanisms, such as a microphone for speech, a touch-sensitive screen for gesture or graphical input, keyboard, mouse, motion input, speech and so forth. Additionally, input device 522 may receive measured data obtained from transmitters 102 and receivers 104 of EM logging tool 100, discussed above. An output device 524 may also be one or more of a number of output mechanisms known to those of skill in the art. In some instances, multimodal systems enable a user to provide multiple types of input to communicate with information handling system 144. Communications interface 526 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 502, that is purpose-built to operate as an equivalent to software executing on a general-purpose processor. For example, the functions of one or more processors presented in FIG. 5 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 508 for storing software performing the operations described below, and random-access memory (RAM) 510 for storing results. Very large-scale integration (VLSI) hardware embodiments, as well as custom VLSI circuitry in combination with a general-purpose DSP circuit, may also be provided.

Figure 6:
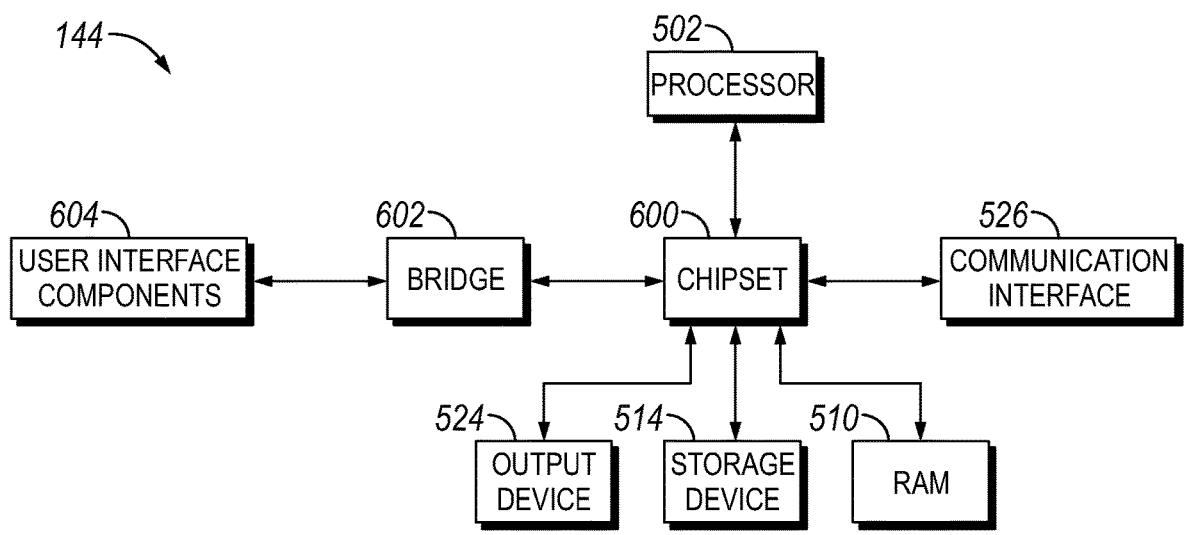
FIG. 6 illustrates another schematic view of an information handling system.

FIG. 6 illustrates an example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may comprise a processor 502, representative of any number of physically and/or logically distinct resources capable of executing software, firmware, and hardware configured to perform identified computations. Processor 502 may communicate with a chipset 600 that may control input to and output from processor 502. In this example, chipset 600 outputs information to output device 524, such as a display, and may read and write information to storage device 514, which may comprise, for example, magnetic media, and solid-state media. Chipset 600 may also read data from and write data to RAM 510. A bridge 602 for interfacing with a variety of user interface components 604 may be provided for interfacing with chipset 600. Such user interface components 604 may comprise a keyboard, a microphone, touch detection and processing circuitry, a pointing device, such as a mouse, and so on. In general, inputs to information handling system 144 may come from any of a variety of sources, machine generated and/or human generated.

Chipset 600 may also interface with one or more communication interfaces 526 that may have different physical interfaces. Such communication interfaces may comprise interfaces for wired and wireless local area networks, for broadband wireless networks, as well as personal area networks. Some applications of the methods for generating, displaying, and using the GUI disclosed herein may comprise receiving ordered datasets over the physical interface or be generated by the machine itself by processor 502 analyzing data stored in storage device 514 or RAM 510. Further, information handling system 144 receive inputs from a user via user interface components 604 and execute appropriate functions, such as browsing functions by interpreting these inputs using processor 502.

In examples, information handling system 144 may also comprise tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may comprise RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be comprised within the scope of the computer-readable storage devices.

Computer-executable instructions comprise, for example, instructions and data which cause a general-purpose computer, special purpose computer, or special purpose processing device to perform a certain function or group of functions. Computer-executable instructions also comprise program modules that are executed by computers in stand-alone or network environments. Generally, program modules comprise routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

During the EM tool logging operations of FIG. 1, information handling system 144 may process different types of the real time data and post-process data originated from varied sampling rates and various sources, such as diagnostics data, sensor measurements, operations data, and or the like as collected by EM logging tool 100. (e.g., referring to FIG. 1). These measurements (m) from the EM logging tool 100 may allow for information handling system 144 to perform real-time assessments of the EM logging operation.

Figure 7:
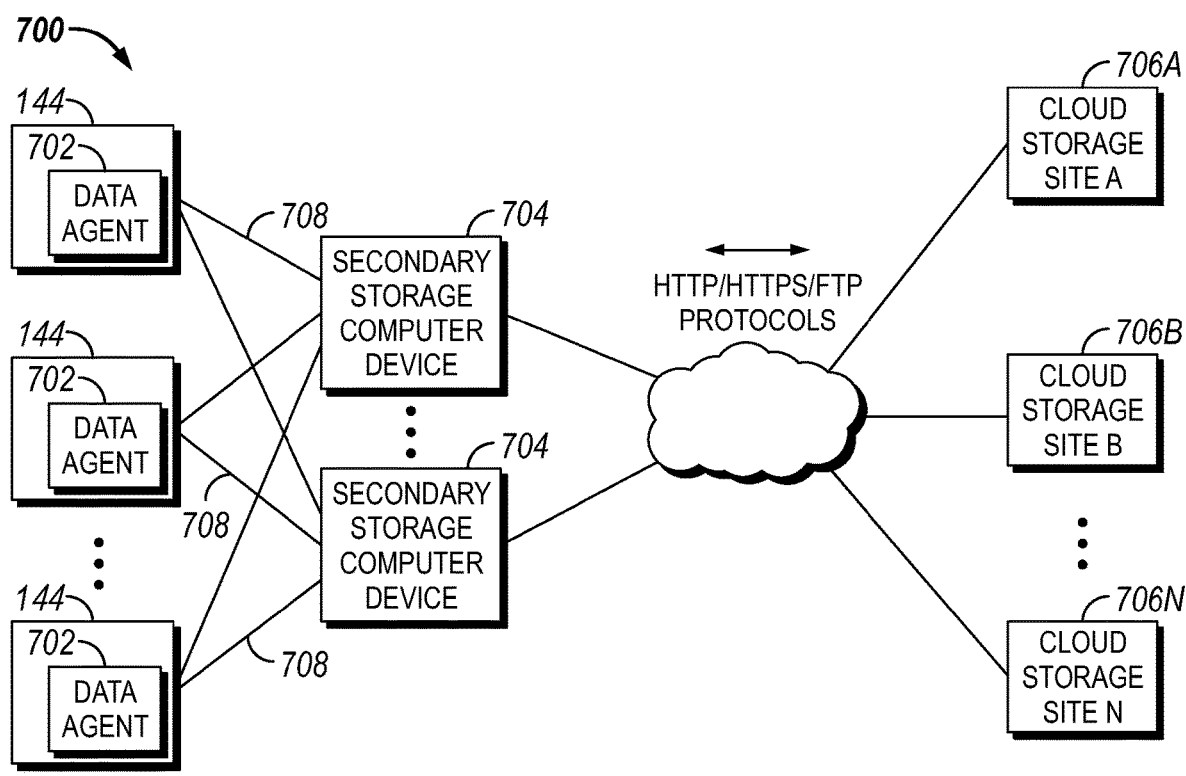
FIG. 7 illustrates a schematic view of a network.

FIG. 7 illustrates an example of one arrangement of resources in a computing network 700 that may employ the processes and techniques described herein, although many others are of course possible. As noted above, an information handling system 144, as part of their function, may utilize data, which comprises files, directories, metadata (e.g., access control list (ACLS) creation/edit dates associated with the data, etc.), and other data objects. The data on the information handling system 144 is typically a primary copy (e.g., a production copy). During a copy, backup, archive or other storage operation, information handling system 144 may send a copy of some data objects (or some components thereof) to a secondary storage computing device 165 by utilizing one or more data agents 702.

A data agent 702 may be a desktop application, website application, or any software-based application that is run on information handling system 144. As illustrated, information handling system 144 may be disposed at any well site (e.g., referring to FIG. 1) or at an offsite location. The data agent may communicate with a secondary storage computing device 704 using communication protocol 708 in a wired or wireless system. The communication protocol 708 may function and operate as an input to a website application. In the website application, field data related to pre- and post-operations, notes, and the like may be uploaded. Additionally, information handling system 144 may utilize communication protocol 708 to access processed measurements, troubleshooting findings, historical run data, and/or the like. This information is accessed from secondary storage computing device 704 by data agent 702, which is loaded on information handling system 144.

Secondary storage computing device 704 may operate and function to create secondary copies of primary data objects (or some components thereof) in various cloud storage sites 706A-N. Additionally, secondary storage computing device 704 may run determinative algorithms on data uploaded from one or more information handling systems 144, discussed further below. Communications between the secondary storage computing devices 704 and cloud storage sites 706A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 706A-N, the secondary storage computing device 704 may also perform local content indexing and/or local object-level, sub-object-level or block-level deduplication when performing storage operations involving various cloud storage sites 706A-N. Cloud storage sites 706A-N may further record and maintain logs for each downhole operation or run, store repair and maintenance data, store operational data, and/or provide outputs from determinative algorithms that are located in cloud storage sites 706A-N. In a non-limiting example, this type of network may be utilized as a platform to store, backup, analyze, import, preform extract, transform and load ("ETL") processes, mathematically process, apply machine learning algorithms, and interpret the data acquired by one or more EM logs.

Once measurements (m) from EM logging tool 100 are acquired, the data may be assessed via an interpretation workflow to determine the casing integrity. This may comprise identifying the pipe thickness, magnetic permeability, and electrical conductivity. In some examples the measurements acquired from EM logging tools may be referred to as empirical tool responses. Traditionally, the interpretation workflow may have utilized a model-based inversion which may require inversion hyperparameters specific to the casing design or configuration. The hyperparameters may have been determined by rule-based algorithms guided prior knowledge. Disclosed below are machine learning methods to assist in the interpretation of the measurements (m) obtained by an EM EC logging tool. In some scenarios, machine learning methods may replace a portion of the traditional workflow while in other scenarios machine learning methods may replace the whole interpretation workflow.

A machine learning model may be an empirically derived model which may result from a machine learning algorithm identifying one or more underlying relationships within a dataset. In comparison to a physics-based model, such as Maxwell's Equations, which are derived from first principals and define the mathematical relationship of a system, a pure machine learning model may not be derived from first principals. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a necessary component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may comprise evaluating model performance according to whether the model is over-fit or under-fit. As it may be assumed that all datasets contain some level of error, it may be important to evaluate and optimize the model performance and associated model fit by means of model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods comprise k-fold cross-validation, stratified k-fold cross-validation, bootstrapping, leave-one-out cross-validation, resubstitution, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may comprise the model error, wherein a selected set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may comprise whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset comprises both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may comprise Neural Networks, K-Nearest Neighbors, Naïve Bayes, Decision Trees, Classification Trees, Regression Trees, Random Forests, Linear Regression, Support Vector Machines (SVM), Gradient Boosting Regression, genetic algorithm, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not comprise a dependent variable as the intended function of this type of algorithm is to identify one or more groupings or clusters within a dataset. In a non-limiting example, algorithms which may be utilized for unsupervised machine learning may comprise K-means clustering, K-means classification, Fuzzy C-Means, Gaussian Mixture, Hidden Markov Model, Neural Networks, and Hierarchical algorithms.

Figure 8:
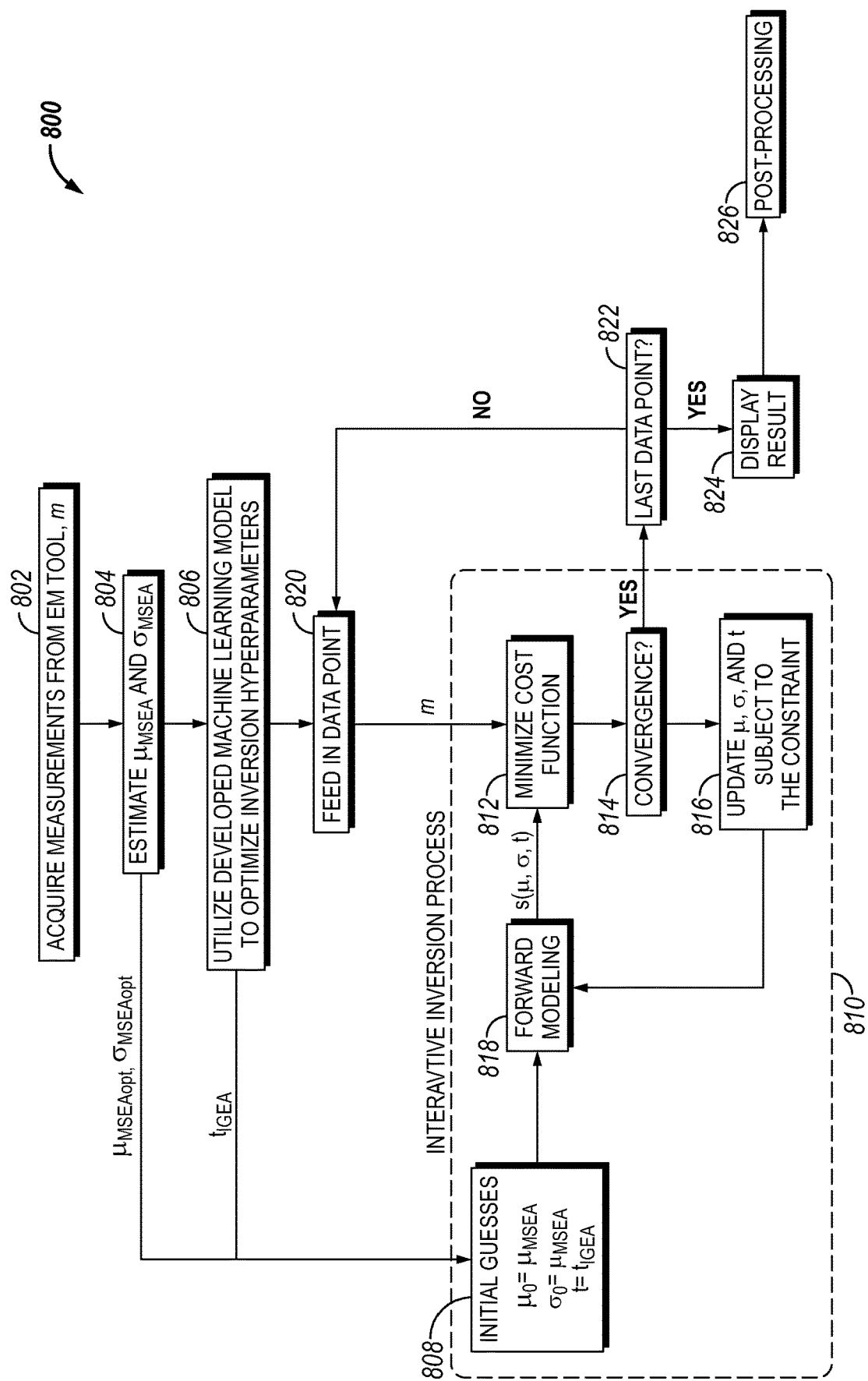
FIG. 8 illustrates a hybrid workflow which incorporates machine learning and a physical-model.

FIG. 8 illustrates a workflow 800 which may be used to solve a model-based inversion to interpret measurements (m) obtained from EM logging tool in block 802. Workflow 800 may be described as a hybrid workflow, as it utilizes both a trained machine learning model along with a physical model-based inversion derived from Maxwell's equations. The measurements (m) obtained from EM logging tool in block 802 may be formed into a well log which may further comprise one or more measurements correlated to various depth points in the wellbore. In some examples a well log may also be referred to as a log. Workflow 800 may be described as a hybrid workflow, as it utilizes both a trained machine learning model along with a model-based inversion derived from Maxwell's equations. The solution to the inversion may comprise pipe and/or casing attributes such as the wall thickness of one or more concentric nested casing strings which may further comprise at least one of a pipe string and or a casing string. The inversion solution may be determined iteratively on a point-by-point basis by minimizing a cost function related to each data point in a log collected by an EM logging tool until a convergence criteria is achieved. Solving the inversion may require additional inputs in the form of inversion hyperparameters which may be determined prior to executing the iterative inversion process. The inversion hyperparameters may comprise average magnetic permeability and electrical conductivity ($\mu$, $\sigma$), calibration constants ($W_{cal}$) channel weights ($W_{m,abs}$, $W_{m,angle}$), one or more initial guesses ($x_{IG}$), and regularization parameters ($W_x$). The average magnetic permeability ($\mu$), and electrical conductivity ($\sigma$), may also be referred to as the "pipe material properties," or the "pipe electrical properties." While the calibration constants ($W_{cal}$) channel weights ($W_{m,abs}$, $W_{m,angle}$), one or more initial guesses ($x_{IG}$), and regularization parameters ($W_x$) may be determined from a machine learning model, the average magnetic permeability ($\mu$), and electrical conductivity ($\sigma$) may be utilized as inputs to the trained machine learning model, and therefor may not be determined from the trained machine learning model. In some examples, the regularization parameters may function as a control on the cost function minimization such that the cost function will be penalized for large changes in the target values with each iteration. In further examples, the target values may be the pipe attributes.

Figure 9:
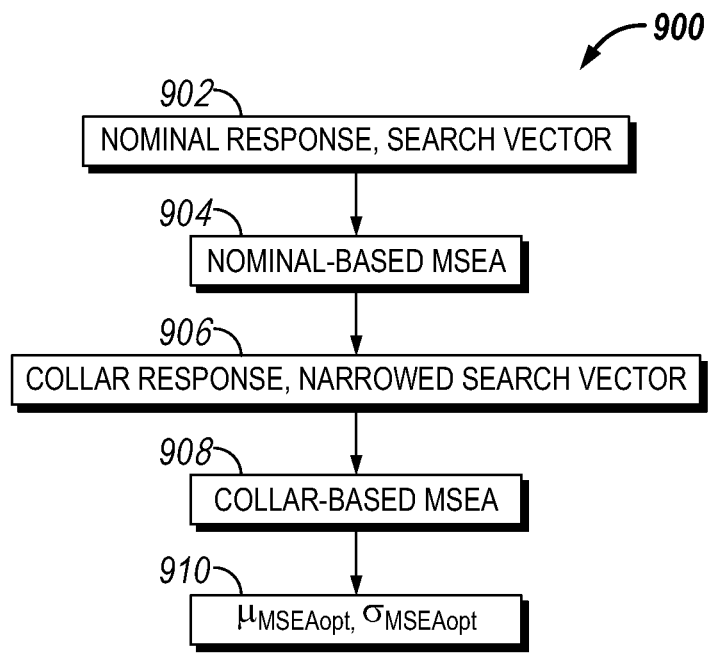
FIG. 9 illustrates a workflow to estimate a set of pipe material properties.

FIG. 9 illustrates a workflow which may be used to estimate a set of pipe material properties. The average magnetic permeability ($\mu$), and electrical conductivity ($\sigma$) may be determined in block 804 according to workflow 900 as detailed in FIG. 9. Workflow 900 may relate to determining a selected combination of the average magnetic permeability ($\mu$), and electrical conductivity ($\sigma$) from what may be referred to as the "Mu/Sigma Estimation Algorithm," ("MSEA"). The selected combination may be the combination that minimizes the difference between a measured response and a synthetic response. In some examples there may be more than one measured and synthetic responses, respectively. In further examples the synthetic responses may be referred to as the predicted responses, a synthetic model, or a reference model. The MSEA may be an algorithm which incorporates one or more point-by-point responses measured by an EM logging tool along with an initial guess of the pipe thickness to estimate an initial guess for each of the average magnetic permeability ($\mu$), and electrical conductivity ($\sigma$). The point-by-point responses may be associated with a particular depth in a wellbore. These initial guesses may be referred to as nominal values, where the nominal thickness, nominal average magnetic permeability, and nominal electrical conductivity may be written as $t_{nom}$, $\mu_{nom}$, and $\sigma_{nom}$, respectively. Furthermore, these initial guesses may be utilized in conjunction with Maxwell's equation to simulate a nominal pipe thickness and eccentricity, which may be labelled $x_{nom}$. The MSEA may consist of two sub-algorithms which comprise the nominal-based MSEA as shown in block 904 and the collar-based MSEA as shown in block 908. In each sub-algorithm, the measured data may be evaluated to identify a measured response to be used as a datum point. In examples, workflow 900 may begin with block 902. In block 902, the nominal-based MSEA may comprise conducting a linear search over a vector containing values of average magnetic permeability ($\mu$), and electrical conductivity ($\sigma$). This linear search may result in a reduced search vector which may then be utilized in block 906 to identify the collar-based MSEA in block 908. The resulting solution may identify a selected combination of the average magnetic permeability ($\mu$), and electrical conductivity ($\sigma$) which may be denoted in block 910 as $\mu_{SEAopt}$ and $\sigma_{SEAopt}$, respectively. The selected combination may be the combination that minimizes the difference between the measured responses and synthetic responses. In some examples the synthetic responses may be referred to as the predicted responses, a synthetic model, or a reference model. The selected combination of the average magnetic permeability ($\mu$), and electrical conductivity ($\sigma$) identified in block 910 of workflow 900 may be used as inputs to workflow 800 in blocks 806 and 808. In block 806, the values may be used as inputs to a machine learning workflow which may further identify the inversion hyperparameters for use in the iterative inversion process of block 810. In block 808 the values may be used along with an initial guess of the casing thickness ($t_{IGEA}$) as a starting point for iterative inversion process of block 810.

Figure 10:
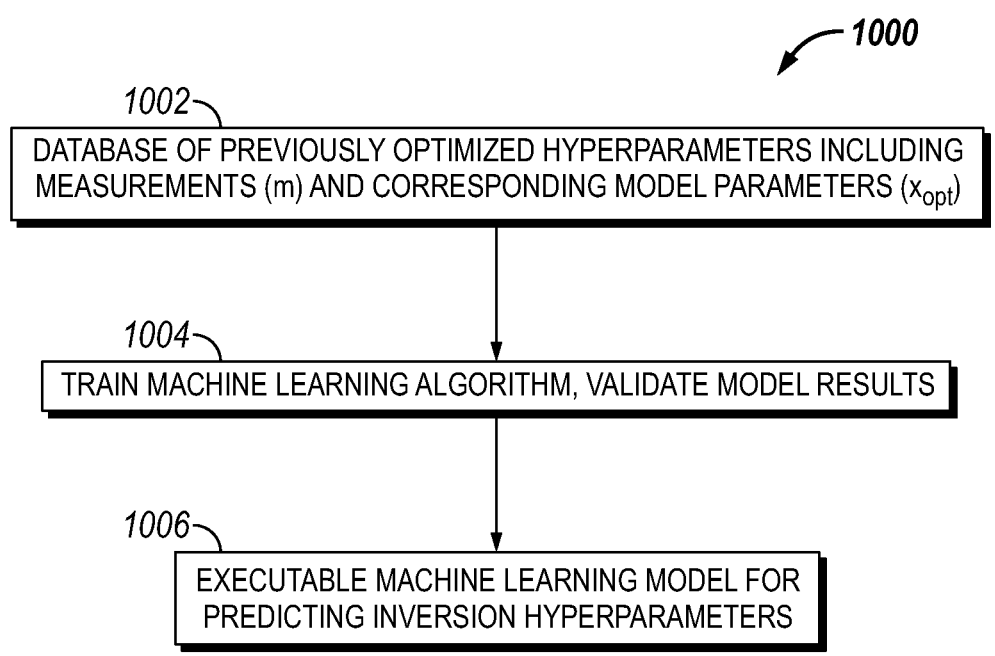
FIG. 10 illustrates a workflow for predicting inversion hyperparameters from a machine learning model.

In block 806 of workflow 800, the selected combination of the average magnetic permeability ($\mu$), and electrical conductivity ($\sigma$) may function as independent variables to a trained machine learning model. This model may be used to predict one or more dependent variables which may comprise the remaining inversion hyperparameters. The hyperparameters identified from the trained machine learning model may be used as inputs to solve the model-based inversion. As previously mentioned, these hyperparameters may comprise calibration constants ($W_{cal}$), channel weights ($W_{m,abs}$, $W_{m,angle}$), one or more initial guesses ($x_{IG}$), and regularization parameters ($W_x$). The trained machine learning model of block 806 may be developed by training a machine learning algorithm on a training dataset obtained from previously processed EM measurements (m) in which rule-based algorithms and/or prior knowledge were used to identify the selected hyperparameters. The training dataset for the model may comprise both independent and dependent variables and may be used to predict a continuous variable. As such, the desired machine learning algorithm may fall into the category of a supervised algorithm, a regression algorithm, or a supervised regression algorithm. The model building process may be outlined in workflow 1000 of FIG. 10 which illustrates a workflow for predicting inversion hyperparameters from a machine learning model. Block 1002 may comprise the dataset of previously determined hyperparameters which may consist of independent variables such as measurements (m) obtained from the EM logging tool which have been previously processed to identify the associated hyperparameters (e.g. calibration constants ($W_{cal}$), channel weights ($W_{m,abs}$, $W_{m,angle}$), one or more initial guesses ($x_{IG}$), and regularization parameters ($W_x$)) which may have been selected with the help of rule-based knowledge. These hyperparameters may function as the corresponding dependent variable in the training dataset.

Block 1004 may show training and validating a machine learning model by allowing a machine learning algorithm to learn about the relationships between the independent and dependent variables within the training dataset of block 1002. The training dataset of block 1002 may include previously analyzed measurements acquired from an EM logging tool. In some examples this training dataset may be referred to as a historical dataset. In further examples the independent variables in the dataset may include the measurements acquired from an EM logging tool. The independent variables may further include the average magnetic permeability ($\mu$), and electrical conductivity ($\sigma$) identified in workflow 900. In some examples, the dependent variables of the training dataset may include inversion hyperparameters which were identified according to prior analysis. Block 1006 may show the resulting machine learning model which may be able to predict the inversion hyperparameters for given combinations of the average magnetic permeability ($\mu$), and electrical conductivity ($\sigma$). As previously noted, the predicted hyperparameters may comprise calibration constants ($W_{cal}$), channel weights ($W_{m,abs}$, $W_{m,angle}$), one or more initial guesses ($x_{IG}$), and regularization parameters ($W_x$).

Figure 11:
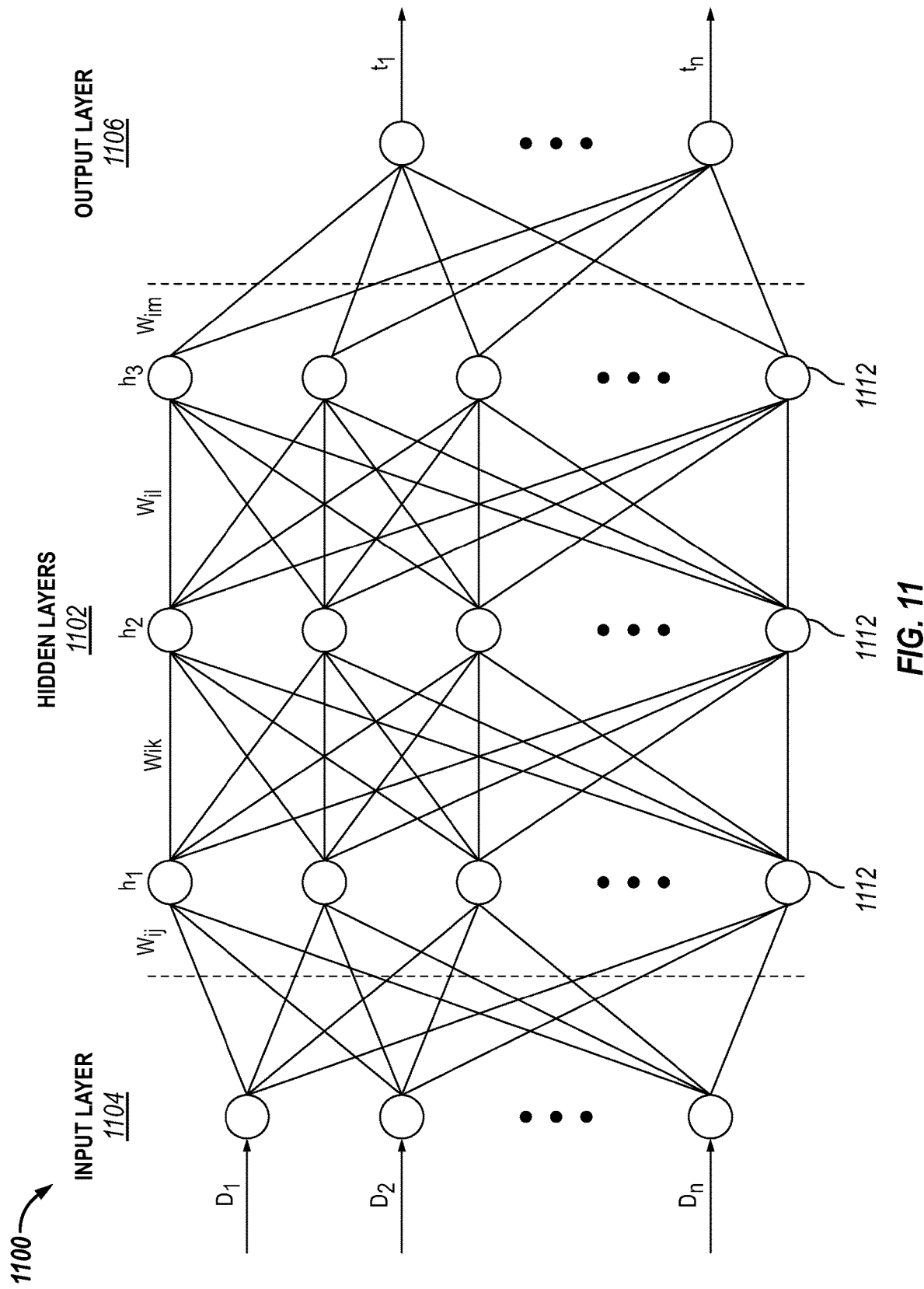
FIG. 11 illustrates a schematic view of a neural network.

As previously noted, neural networks may function as supervised regression algorithms, and as such, the machine learning algorithm of block 1004 may comprise a neural network as illustrated in FIG. 11. Examples of machine learning algorithms that fall into the category of neural networks may comprise Perceptron, Multi-Layer Perceptron, Feed Forward, Radial Basis Network, Deep Feed Forward, Recurrent Neural Network, Long Term Memory, Short Term Memory, Deep Neural Network, Gated Recurrent Unit, Auto Encoder, Variational AE, Denoising AE, Sparse AE, Markov Chain, Hopfield Network, Boltzmann Machine, Restricted Boltzmann Machine, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, and Neural Turing Machine. Neural network 1100 of FIG. 11 may be utilized to draw a relationship between independent and dependent variables detailed in the dataset of block 1002. Neural network 1100 may be an artificial neural network with one or more hidden layers 1102 between input layer 1104 and output layer 1106. As illustrated, input layer 1104 may comprise the selected combination of the average magnetic permeability ($\mu$), and electrical conductivity ($\sigma$), and measurements (m) obtained from the EM logging tool, whereas output layers 1106 may comprise the inversion hyperparameters along with an initial estimate of the casing thickness ($t_{IGEA}$). Input data is taken by neurons 1112 in first layer which then provide an output to the neurons 1112 within next layer and so on which provides a final output in output layer 1106. Each layer may have one or more neurons 1112. The connection between two neurons 1112 of successive layers may have an associated weight. The weight defines the influence of the input to the output for the next neuron 1112 and eventually for the overall final output. The process of training the neural network may entail determining the suitable weights that produce an accurate model capable of predicting the inversion hyperparameters. Furthermore, building the machine learning model may be an iterative process which comprises a validation component as previously mentioned. Once a model which meets one or more criterion for deployment, which in a non-limiting example may comprise achieving a certain level of accuracy, it may be utilized to predict the inversion hyperparameters as shown in block 1006. In some examples, the level of accuracy which meets the deployment criterion may range from about 50% to about 100%. Alternatively, the level of accuracy may range from about 50% to about 60%, about 60% to about 70%, about 70% to about 80%, about 80% to about 90%, or about 90% to about 100%. Predictions in the form of resultant dependent values may be identified by a trained machine learning model when the model is queried about a given set of independent variables. Finally, if the historical dataset, which may comprise previously analyzed measurements (m) obtained from EM logging tools, increases in size due to the acquisition of additional data, the model may be retrained to incorporate the learnings of the additional data.

Returning to FIG. 8, once the inversion hyperparameters have been determined from the machine learning model of block 806, they may be incorporated with the selected combination of the average magnetic permeability ($\mu$), and electrical conductivity ($\sigma$) and one or more measurements (m) obtained from EM logging tools in the iterative inversion process of block 810. Datapoints from the measurements (m) obtained from EM logging tools may be provided to the iterative inversion process as shown in block 820. The inversion may be based on optimization theory. The process of converging on a solution may comprise minimizing the difference between one or more measured and one or more synthetic responses. In some examples the synthetic responses may be referred to as the predicted responses, a synthetic model, or a reference model. The synthetic responses may be generated from the forward modeling process of block 818. The forward model may be based on Maxwell's equation. It may be executed iteratively or repeatedly until the misfit error, or mismatch, between the predicted or synthetic model parameters and the measurements in the log reach a preset threshold. In some examples the preset threshold may be selected by personnel. The reduction in the error, mismatch, or misfit between the synthetic model values and the measured model values may be referred to as convergence as shown in block 814. The iterative inversion process of block 810 may function to minimize a cost function of block 812. The cost function may comprise of three terms: the misfit of the magnitude, the misfit of the phase, and a regularization term to restrict non-physical solutions. An example of the inversion cost function which may be minimized to solve for the casing thickness may be written as:

$$F(x) = \frac{1}{2M} \left\| W_{m,abs} \times \left[ \text{abs}\left\{ \frac{s(x)}{W_{cal}m} \right\} - 1 \right] \right\|^2 + \frac{1}{2M} \left\| W_{m,angle} \times \text{phase}\left\{ \frac{s(x)}{W_{cal}m} \right\} \right\|^2 + \| W_x \times (x - x_{IG}) \|^2 \quad (6)$$

Where x may be a vector of N unknown model parameters which may comprise the number of pipes, the thickness of the pipe, the magnetic permeability of the pipe, and the eccentricity of the pipe. The variable m may comprise a vector of size M which further comprises complex-valued measurements (m) acquired at different receivers and frequencies where the size of the vector, M, may be calculated by multiplying the number of receivers and the number of frequencies. An additional vector of size M may comprise predicted or synthetic responses from the forward modeling process and may be represented as s(x). The vector of synthetic responses may also be referred to as the synthetic model. In some examples the synthetic model may comprise responses from a physics-based model, results from an empirical database, or nominal prediction values. The variables $W_{m,abs}$ and $W_{m,angle}$ may be used to assign different weights to different measurements (m) based on the relative quality of importance of each measurement. The variable $W_{cal}$ may be a matrix of calibration constants. The variable $W_x$ may be a matrix of regularization parameters. The variable $x_{IG}$ may consist of a vector of initial guesses.

After each iteration in iterative inversion process of block 810, a calculation is performed to determine if a convergence criterion, as in block 814, has been met. With each iteration the estimated values of average magnetic permeability (µ), electrical conductivity (σ), and casing thickness (t) are updated as shown in block 816 until convergence criterion of block 814 is achieved. It should be noted that estimated values of average magnetic permeability (µ), electrical conductivity (σ), and casing thickness (t) may be utilized to identify the location one or more collars 132 (e.g., referring to FIG. 1) and/or corrosion on pipe string 138 or casing string 108. In some examples, the updating that occurs in block 816 may also be described as "updating the synthetic model." The iterative convergence process may be performed on one or more datapoints from measurements (m) obtained from EM logging tool in block 802 until the final datapoint is analyzed as shown in block 822. In some examples the one or more datapoints correlate to one or more depth points. The resulting analysis may be displayed using an information handling system as in block 824. Once an analysis has been developed it may be used to identify opportunities for performing casing operations, tubular operations, or wellbore remediation operations. Specifically, operations may be performed knowing the location of one or more collars 132 or operations may be performed to remediate corrosion on pipe string 138 or casing string 108. Such operations may be described as post-process operations as shown in block 826. In non-limiting examples, such operations may include installing casing patches, setting packers or plugs, setting tubing anchors, performing remedial cementing jobs, installing tie-back strings, wellbore isolation operations, chemical or mechanical cutting operations, local casing removal, local casing replacement, chemical treatments, or wellbore re-alignment operations.

Figure 12:
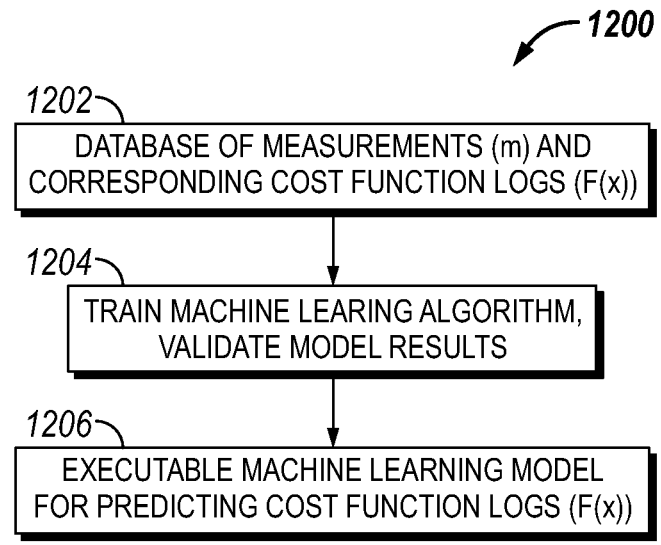
FIG. 12 illustrates a workflow for predicting cost function logs from a machine learning model.

FIG. 12 may relate to a workflow 1200 which may be used to predict the cost function logs. Cost function logs may be values of the cost function F(x) recorded for different values of measurements (m) and different values of model parameters (x). The machine learning model building process for workflow 1200 may be similar to the model building process described in FIGS. 10 and 11. However, there may be differences between the model building processes including the structure and contents of the dataset used to train the model. As noted in block 1202, the amassed dataset used to train the model comprises independent variables such as measurements from an EM logging tool along with a dependent variable such as the corresponding cost function logs. The training dataset may comprise previously analyzed measurements from EM logging tools which may further include previously optimized inversions. In some examples the training datasets comprising previously analyzed data may be referred to as empirical datasets or empirical databases. The training datasets may also contain synthetic data. Since the training dataset for the model may comprise both independent and dependent variables and the goal of the model may be to predict a continuous variable, a supervised regression algorithm may be selected for model building.

As previously noted, neural networks may function as supervised regression algorithms, and as such, the machine learning algorithm of block 1204 may comprise a neural network as displayed in FIG. 11. Input data is taken by neurons 1112 in first layer which then provide an output to the neurons 1112 within next layer and so on which provides a final output in output layer 1106. Each layer may have one or more neurons 1112. The connection between two neurons 1112 of successive layers may have an associated weight. The weight defines the influence of the input to the output for the next neuron 1112 and eventually for the overall final output. The process of training the neural network may entail determining the suitable weights that produce an accurate model capable of predicting the casing thickness. Building the machine learning model may be an iterative process which comprises a validation component as previously mentioned. Once a model which meets a criterion for deployment, which in a non-limiting example may comprise achieving a certain level of accuracy, it may be utilized to predict cost function logs as shown in block 1206. In some examples, the level of accuracy which meets the deployment criterion may range from about 50% to about 100%. Alternatively, the level of accuracy may range from about 50% to about 60%, about 60% to about 70%, about 70% to about 80%, about 80% to about 90%, or about 90% to about 100%. Predictions may be created by a machine learning model when the model is queried about the resulting dependent variable response to a given set of independent variables. Finally, if the dataset increases in size due to the acquisition of data, the model may be retrained to incorporate the learnings of the additional data.

Figure 13:
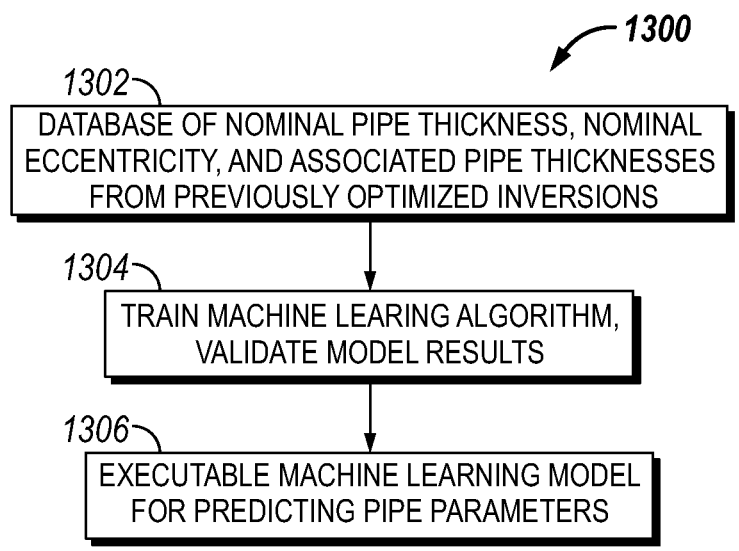
FIG. 13 illustrates a workflow for predicting pipe thickness from a machine learning model.

FIG. 13 may relate to a workflow 1300 which may be used to replace the iterative inversion process. The machine learning model building process for workflow 1300 may be similar to the model building process described in FIGS. 10 and 11. However, there may be differences between the model building processes including the structure and contents of the dataset used to train the model. As noted in block 1302, the amassed dataset used to train the model may comprise independent variables such as measurements from an EM logging tool, casing design, nominal pipe thickness, and nominal eccentricity, along with a dependent variable such as calculated pipe thickness or other pipe attributes. In some examples the pipe attributes may be nominal pipe attributes. The training dataset may comprise previously analyzed measurements from EM logging tools which may further include previously optimized inversions. In some examples the training datasets comprising previously analyzed data may be referred to as empirical datasets or empirical databases. The training datasets may also contain synthetic data. Since the training dataset for the model may comprise both independent and dependent variables and the goal of the model may be to predict a continuous variable, a supervised regression algorithm may be selected for model building.

As previously noted, neural networks may function as supervised regression algorithms, and as such, the machine learning algorithm of block 1304 may comprise a neural network as displayed in FIG. 11. Input data is taken by neurons 1112 in first layer which then provide an output to the neurons 1112 within next layer and so on which provides a final output in output layer 1106. Each layer may have one or more neurons 1112. The connection between two neurons 1112 of successive layers may have an associated weight. The weight defines the influence of the input to the output for the next neuron 1112 and eventually for the overall final output. The process of training the neural network may entail determining the suitable weights that produce an accurate model capable of predicting the casing thickness. Building the machine learning model may be an iterative process which comprises a validation component as previously mentioned. Once a model which meets a criterion for deployment, which in a non-limiting example may comprise achieving a certain level of accuracy, it may be utilized to predict pipe thickness as displayed in block 1306. In some examples, the level of accuracy to meet the deployment criterion may range from about 50% to about 100%. Alternatively, the level of accuracy may range from about 50% to about 60%, about 60% to about 70%, about 70% to about 80%, about 80% to about 90%, or about 90% to about 100%. Predictions may be created by a machine learning model when the model is queried about the resulting dependent variable response to a given set of independent variables. Finally, if the dataset increases in size due to the acquisition of data, the model may be retrained to incorporate the learnings of the additional data.

The proposed method may make use of prior measurements and associated analysis to further automate the process of identifying parameters wherein such parameters of interest may include hyperparameters, cost function logs, or pipe attributes. As compared to the current manual approach, the proposed approach may provide for a more objective methodology with the added benefit of reduced computational requirements. As such, the proposed approach may improve operational efficiency while increasing quality assurance through increased consistency and repeatability. Improvements offered by the current disclosure include combining the machine-learning-based method to determine hyperparameters and physical model-based optimization inversion. The machine-learning-based approach may be able to automatically determine the hyperparameters from previously processed wells. This approach may be faster than existing algorithms, which may allow for reduce processing time for analysis. In addition, calculating hyperparameters according to this approach may be more objective due to the lack of user input which may be subjective. This may improve the consistency and repeatability of the inversion results, especially for time-lapsed loggings performed at different times. Other improvements may include the replacement of potentially computationally expensive numerical forward modeling calculations with machine learning models. The previous methodology may have utilized numerical forward modeling based on Maxwell's equations. In the improved methodology, machine learning models may significantly reduce computation time and increase consistency and repeatability in the results.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method, comprising:
   disposing an EM logging tool in a wellbore;
   acquiring one or more measurements with the EM logging tool from one or more depth points within the wellbore comprising a tubular string;
   training a machine learning model using a training dataset to form a trained machine learning model trained to estimate a synthetic response corresponding to a set of candidate pipe parameters;
   validating the machine learning model by using the model to process a test dataset comprising a selected subset of the training dataset;
   defining a cost function to minimize a mismatch between the one or more measurements and the synthetic response;
   minimizing the mismatch;
   updating one or more inputs to the trained machine learning model to form an updated synthetic response;
   repeating the minimizing the mismatch with the updated synthetic response until a threshold is met; and
   estimating one or more pipe attributes based at least in part on the updated synthetic response;
   inputting the one or more estimated pipe attributes into a second trained machine learning model, wherein the second trained machine learning model produces one or more outputs, wherein the one or more outputs:
   are based at least in part on the at least one parameter; and
   comprise one or more estimated pipe attributes;
      inputting an average magnetic permeability and an electrical conductivity into the second trained machine learning model; and
      performing a wellbore operation based at least in part on the one or more estimated pipe attributes, wherein:
         the average magnetic permeability and the electrical conductivity are not identified by the first trained machine learning model,
         the one or more outputs of the second trained machine learning model is additionally based, at least in part, on the average magnetic permeability and the electrical conductivity,
         the one or more estimated pipe attributes comprise at least one feature of the tubular string selected from the group consisting of: thickness, percentage metal loss or gain, eccentricity, inner diameter of a casing, location of one or more collars, corrosion, and any combination thereof, and
         the wellbore operation comprises at least one operation selected from the group consisting of setting packers or plugs, setting tubing anchors, performing a remedial cementing job, installing tie-back strings, wellbore isolation, chemical or mechanical cutting, casing removal, casing replacement, chemical treatment, wellbore re-alignment, and any combination thereof.

2. The method of claim 1, further comprising:
   training the second machine learning model to estimate one or more inversion hyperparameters using the trained machine learning model and the one or more measurements; and
   optimizing the cost function using the one or more inversion hyperparameters.

3. A method, comprising:
   disposing an electromagnetic (EM) logging tool in a wellbore, wherein the EM logging tool comprises:
   one or more transmitters disposed on the EM logging tool; and
   one or more receivers disposed on the EM logging tool;
   transmitting an electromagnetic field from the one or more transmitter into a tubular string to energize the tubular string with the electromagnetic field thereby producing an eddy current that emanates from the tubular string;
   measuring the eddy current in the tubular string with the one or more receivers on at least one channel to obtain one or more measurements from the EM logging tool;
   forming an EM log from the one or more measurements;
   forming; in a machine learning model, a relationship between a set of one or more previously analyzed measurements and at least one pipe property;
   validating the machine learning model by processing a predetermined subset of the previously analyzed measurements, and
   estimating, with the machine learning model, the at least one pipe property from the formed relationship and the one or more measurements from the EM logging tool;
   inputting the one or more estimated pipe attributes into a second trained machine learning model, wherein the second trained machine learning model produces one or more outputs, wherein the one or more outputs:
   are based at least in part on the at least one parameter; and
   comprise one or more estimated pipe attributes;
      inputting an average magnetic permeability and an electrical conductivity into the second trained machine learning model; and
      performing a wellbore operation based at least in part on the one or more estimated pipe attributes, wherein:
         the average magnetic permeability and the electrical conductivity are not identified by the first trained machine learning model,
         the one or more outputs of the second trained machine learning model is additionally based, at least in part, on the average magnetic permeability and the electrical conductivity,
         the one or more estimated pipe attributes comprise at least one feature of the tubular string selected from the group consisting of: thickness, percentage metal loss or gain, eccentricity, inner diameter of a casing, location of one or more collars, corrosion, and any combination thereof, and
         the wellbore operation comprises at least one operation selected from the group consisting of setting packers or plugs, setting tubing anchors, performing a remedial cementing job, installing tie-back strings, wellbore isolation, chemical or mechanical cutting, casing removal, casing replacement, chemical treatment, wellbore re-alignment, and any combination thereof.

4. The method of claim 3, wherein the at least one pipe property comprises individual thickness of the tubular string.

5. The method of claim 3, wherein the at least one pipe property comprises a percentage metal loss or gain of the tubular string.

6. The method of claim 3, wherein the at least one pipe property comprises an individual magnetic permeability of the tubular string.

7. The method of claim 3, wherein the at least one pipe property comprises an individual electrical conductivity of the tubular string.

8. The method of claim 3, wherein the at least one pipe property comprises a total thickness of the tubular string.

9. The method of claim 3, wherein the at least one pipe property comprises an eccentricity of the tubular string and/or an inner diameter of the tubular string.

10. The method of claim 3, wherein the relationship between the one or more previously analyzed measurements and the at least one pipe property comprises a machine learning model that is trained using a previously amassed dataset.

11. The method of claim 10, wherein a dependent variable comprises one or more hyperparameters.

12. The method of claim 10, wherein a dependent variable comprises one or more cost function logs.

13. The method of claim 10, wherein a dependent variable comprises the at least one pipe property.

14. The method of claim 10, wherein a trained machine learning model is generated using a machine learning algorithm comprising a regression.

15. The method of claim 10, wherein a trained machine learning model is generated using a support vector machine.

16. The method of claim 10, wherein a trained machine learning model is generated using a genetic algorithm.

17. The method of claim 10, wherein a trained machine learning model is generated using a decision tree.

18. The method of claim 10, wherein a trained machine learning model is generated using a neural network.

19. A method comprising:
acquiring one or more measurements with an EM logging tool from one or more depth points within a wellbore comprising a tubular string;
training a first machine learning model using a training dataset to create a first trained machine learning model;
validating the first machine learning model by processing a test dataset comprising a selected subset of the training dataset;
identifying using at least the first trained machine learning model at least one hyperparameter selected from the group consisting of: a calibration constant, a channel weight, a regularization parameter, and any combination thereof; and
inputting the at least one parameter into a second trained machine learning model, wherein the second trained machine learning model produces one or more outputs, wherein the one or more outputs:
are based at least in part on the at least one parameter; and
comprise one or more estimated pipe attributes;
inputting an average magnetic permeability and an electrical conductivity into the second trained machine learning model; and
performing a wellbore operation based at least in part on the one or more estimated pipe attributes, wherein:
the average magnetic permeability and the electrical conductivity are not identified by the first trained machine learning model,
the one or more outputs of the second trained machine learning model is additionally based, at least in part, on the average magnetic permeability and the electrical conductivity,
the one or more estimated pipe attributes comprise at least one feature of the tubular string selected from the group consisting of: thickness, percentage metal loss or gain, eccentricity, inner diameter of a casing, location of one or more collars, corrosion, and any combination thereof, and
the wellbore operation comprises at least one operation selected from the group consisting of setting packers or plugs, setting tubing anchors, performing a remedial cementing job, installing tie-back strings, wellbore isolation, chemical or mechanical cutting, casing removal, casing replacement, chemical treatment, wellbore re-alignment, and any combination thereof.

* * * * *